United States Patent [19]

Freyberger et al.

[11] Patent Number: 4,672,428
[45] Date of Patent: Jun. 9, 1987

[54] INTEGRATED DIGITAL GAIN CONTROL CIRCUIT FOR DIGITAL CHROMINANCE SIGNALS

[75] Inventors: Laurin C. Freyberger, Endingen; Friedrich Schmidtpott, Gundelfingen, both of Fed. Rep. of Germany

[73] Assignee: Deutsche ITT Industries GmbH, Freiburg, Fed. Rep. of Germany

[21] Appl. No.: 836,410

[22] Filed: Mar. 5, 1986

[30] Foreign Application Priority Data

Mar. 7, 1985 [EP] European Pat. Off. ........ 85102591.6

[51] Int. Cl.⁴ .............................................. H04N 9/64
[52] U.S. Cl. ..................................................... 358/27
[58] Field of Search ......................................... 358/27

[56] References Cited

U.S. PATENT DOCUMENTS

| 4,419,688 | 12/1983 | Miskin | 358/27 |
| 4,510,521 | 4/1985 | Rupright | 358/27 |
| 4,539,583 | 9/1985 | Flamm | 358/27 |
| 4,602,276 | 7/1986 | Fling | 358/27 |

FOREIGN PATENT DOCUMENTS 0074682  3/1983  European Pat. Off. ............. 358/27

Primary Examiner—Michael A. Masinick
Attorney, Agent, or Firm—Thomas L. Peterson

[57] ABSTRACT

The burst signal existing on the back porch of the composite color signal is brought to a predetermined normalized value with the aid of an amplitude control loop. In order to further increase the gain of a multiplier provided for in the control loop the multiplier is preceded by a premultiplier of simple design, whose multiplication factor is capable of being switched over in powers of two. A multiplication factor setting signal, is converted via a code converter into two control signals, with the first control signal setting the multiplication factor of the premultiplier, and with the second control signal setting the multiplication factor of the multiplier.

12 Claims, 1 Drawing Figure

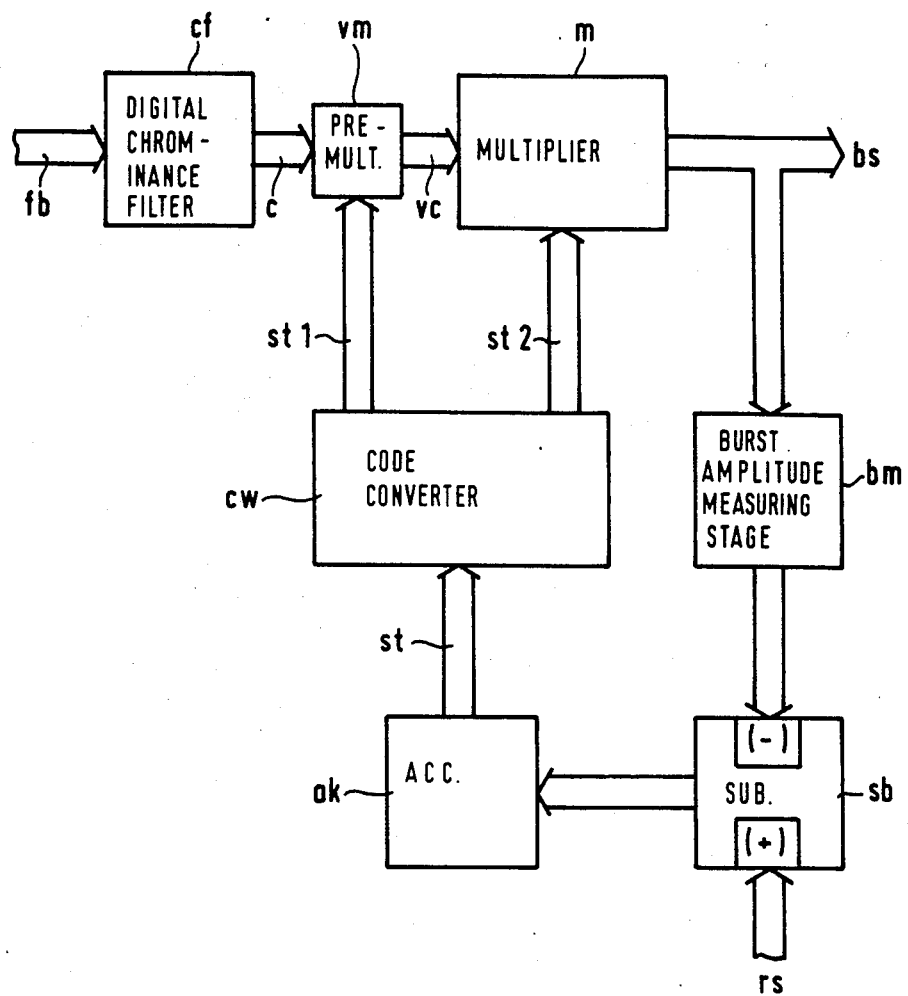

INTEGRATED DIGITAL GAIN CONTROL CIRCUIT FOR DIGITAL CHROMINANCE SIGNALS

BACKGROUND OF THE INVENTION

The invention pertains to an integrated digital gain control circuit for digital chrominance signal in digital color television receivers.

One integrated digital gain control circuit is disclosed in EP-OS No. 00 95 543. With the aid of this circuit, the burst amplitude on the back porch of the composite color signal is compared with an internally stored reference value and brought to the desired amplitude value with the aid of a multiplier having an adjustable multiplication factor. In this way, the color saturation is normalized during the image reproduction at the receiving end, so that amplitude interferences along the transmission path, such as may be caused by reflections, by weak incoming receiving signals or by a television receiver inaccurately adjusted to the receiving frequency only have small effects within certain limits. Operation of this gain control circuit has shown, however, that the originally provided control range is too small. It would be desirable to have the gain control range enlarged so that very weak color signals can be applied to the color stage for further processing with a satisfying color reproduction.

SUMMARY OF THE INVENTION

The invention eliminates this disadvantage, and it is thus one object of the invention to provide an integrated digital gain control circuit for the digital chrominance signal having greater gain control range and which can be inserted with little modification into the previously existing circuit arrangements.

In accordance with the invention, the burst signal existing on the back porch of the composite color signal is brought to a predetermined normalized value with the aid of an amplitude control loop. The loop includes a multiplier to further increase the gain provided for in the control loop. The multiplier is preceded by a premultiplier of simple design, whose multiplication factor is capable of being switched over in powers of two. The multiplication factors of the multiplier and premultiplier are set by using a code converter to convert the setting signal into two control signals, with the first control signal setting the multiplication factor of the premultiplier, and with the second control signal setting the multiplication factor of the multiplier.

BRIEF DESCRIPTION OF THE DRAWING

The invention will now be explained in greater detail with reference to the accompanying drawing. This drawing, in the form of a block diagram, shows the basic principle of the integrated digital gain control circuit according to the invention.

DETAILED DESCRIPTION

The digital chrominance signal c is filtered out of the digitalized composite color signal fb by the digital chrominance filter cf. Chrominance signal c is applied to the first input of the premultiplier vm whose output signal, i.e., the preamplified chrominance signal vc, supplies the first input of the multiplier m. The output signal of the multiplier m is the amplified chrominance signal bs which, on the one hand, is applied to further circuit parts not shown in greater detail herein and also supplies the input of the burst amplitude measuring stage bm. The output thereof is applied to the subtrahend input of the subtracter sb, to the minuend input of which the reference signal rs is applied. The output signal of the subtracter sb is fed to the accumulator ak whose output signal, as a setting signal st, is fed to the input of the code converter cw. This converter converts the setting signal st into the first control signal st1 which is applied to the second input of the premultiplier vm, and into the second control signal st2 which is fed to the second input of the multiplier m.

The multiplier m is prefereably designed in accordance with the pipeline principle in which, by starting out from the least significant position, every respective next higher significant position in two-phase clocking operation, is processed by being delayed by half the time required for one cycle of a clock signal. This manner of processing offers the advantage that the carry over from the next lower significant position and the sum formation of the two positions of the two multiplicants to be interconnected, simultaneously produce the final sum signal of this position as well as the carry over signal for the next higher position. By this technique of time-staggered processing of each position it is possible, in the case of data streams with a large number of positions, to keep the clock frequency high. Consequently, the processing speed can also remain high. The time-staggered passage of the positions, which is effected by a stepwise delay of the individual positions at the beginning of the processing, which is also-referred to as the wedging of the data word, of course represents a transit time delay. The delay results because at the end a corresponding dewedging must also make the data available again parallel in terms of time. After each clock period each of the processing positions is again free for processing the corresponding position of the next wedged data word. Accordingly, per clock period there is actually effected full processing in the entire number of positions.

A multiplier designed in this way, has a structure which is interlinked spatially and with respect to time, and cannot be enlarged without considerable effort. The multiplication factor of the existing multiplier m can be switched over, for example, in steps of $2^{-7}$ between $2^{-1}$ and $2^5$.

Enlargement of the multiplication factor is effected in that, between the chrominance filter cf and the multiplier m, there is inserted the premultiplier vm. Preferably, this premultiplier vm is an electronic multiple switch inserted into the parallel data lines of the chrominance filter cf. The fixed connecting point of the individual switches is respectively connected to one position input of the multiplier m. The first switching input belonging to each switch, is supplied with the corresponding position of the output signal of the chrominance filter cf, so that in the first switch position, the chrominance signal c is switched directly from the chrominance filter cf to the multiplier m. The secondary switch inputs, referred to the corresponding first switch input, are respectively supplied with the next lower position of the output signal of the chrominance filter cf, so that in the second switch position, the chrominance signal c is staggered upwardly by one position in its significance, hence multiplied by the factor 2, and is applied to the multiplier m as the preamplified chrominance signal vc. Of course, any analogous enlargement of the electronic multiple switch by further switch positions is possible, in which then the chrominance signal c, staggered upwardly by the corresponding further positions, reaches the multiplier m. Relative thereto, in each switch position, the amount of gain corresponds to one single power of two. Control of the switch position and, consequently, the fixing of the gain factor, is effected by the first control signal st1 from the code converter cw.

What is claimed is:

1. A digital gain control circuit for a digital chrominance signal comprising:
    a chrominance filter receiving a digitalized composite color signal and providing said digital chrominance signal;
    a premultiplier receiving said digital chrominance signal and a first control signal to provide a preamplified chrominance signal;
    a multiplier receiving said preamplified chrominance signal and a second control signal to generate an amplified chrominance output signal;
    a burst amplitude measuring stage receiving said amplified chrominance output signal;
    a subtracter having its subtrahend input coupled to the output of said burst amplitude measuring stage, a minuend input receiving a reference signal; and an output
    an accumulator coupled to the output of said subtracter and providing a setting signal; and
    a code converter receiving said setting signal and deriving therefrom said first and second control signals, said first and second control signal setting the multiplication factors of said premultiplier and said multiplier, respectively.

2. A digital gain control circuit in accordance with claim 1, wherein:
    said multiplication factor of said preamplifier is a single power of two.

3. A digital gain control circuit in accordance with claim 1, wherein:
    said multiplier is a pipeline principle multiplier in which, starting out from the least significant position, each respectively next higher significant position is processed by being delayed by one clock cycle.

4. A digital gain control circuit in accordance with claim 2, wherein:
    said multiplier is a pipeline principle multiplier in which, starting out from the least significant position, each respectively next higher significant position is processed by being delayed by one clock cycle.

5. A digital gain control circuit in accordance with claim 1, wherein:
    said premultiplier comprising an electronic multiple switch inserted into the parallel data lines of said chrominance filter.

6. A digital gain control circuit in accordance with claim 2, wherein:
    said premultiplier comprising an electronic multiple switch inserted into the parallel data lines of said chrominance filter.

7. A digital gain control circuit in accordance with claim 3, wherein:
    said premultiplier comprising an electronic multiple switch inserted into the parallel data lines of said chrominance filter.

8. A digital gain control circuit in accordance with claim 4, wherein:
    said premultiplier comprising an electronic multiple switch inserted into the parallel data lines of said chrominance filter.

9. A digital gain control circuit for a digital chrominance signal comprising:
    a premultiplier receiving said digital chrominance signal and a first control signal to provide a preamplified chrominance signal;
    a multiplier receiving said preamplified chrominance signal and a second control signal to generate an amplified chrominance output signal;
    a burst amplitude measuring stage receiving said amplified chrominance output signal;
    a subtracter having its subtrahend input coupled to the output of said burst amplitude measuring stage, a minuend input receiving a reference signal; and an output
    an accumulator coupled to the output of said subtracter and providing a setting signal; and
    a code converter receiving said setting signal and deriving therefrom said first and second control signals, said first and second control signal setting the multiplication factors of said premultiplier and said multiplier, respectively.

10. A digital gain control circuit in accordance with claim 9, wherein:
    said multiplication factor of said preamplifier is a single power of two.

11. A digital gain control circuit in accordance with claim 9, wherein:
    said multiplier is a pipeline principle multiplier in which, starting out from the least significant position, each respectively next higher significant position is processed by being delayed by one clock cycle.

12. A digital gain control in accordance with claim 10, wherein:
    said multiplier is a pipeline principle multiplier in which, starting out from the least significant position, each respectively next higher significant position is processed by being delayed by one clock cycle.

* * * * *